(12) United States Patent
Hardy et al.

(10) Patent No.: US 8,774,287 B2
(45) Date of Patent: Jul. 8, 2014

(54) PRECISE COMPENSATION OF VIDEO PROPAGATION DURATION

(75) Inventors: Patrick Hardy, Baulon (FR); Bruno Derrien, Domloup (FR); Bertrand Provost, Saint Gregoire (FR); Olivier Marlec, La Chapelle des Fougeretz (FR); Hubert Prioul, Guignen (FR)

(73) Assignee: Thomson Licensing, Issy-les-Moulineaux (FR)

( * ) Notice: Subject to any disclaimer, the term of this patent is extended or adjusted under 35 U.S.C. 154(b) by 604 days.

(21) Appl. No.: 12/975,533

(22) Filed: Dec. 22, 2010

(65) Prior Publication Data
US 2011/0164178 A1 Jul. 7, 2011

(30) Foreign Application Priority Data

Dec. 31, 2009 (EP) .................................... 09306358
Mar. 11, 2010 (EP) .................................... 10305240

(51) Int. Cl.
*H04N 7/12* (2006.01)
(52) U.S. Cl.
USPC .................................................. 375/240.28
(58) Field of Classification Search
USPC .................................................. 375/240.28
See application file for complete search history.

(56) References Cited

U.S. PATENT DOCUMENTS

| 5,623,483 A * | 4/1997 | Agrawal et al. ............... 370/253 |
| 2002/0001309 A1 | 1/2002 | Saito |
| 2004/0064576 A1* | 4/2004 | Goldhor et al. ............... 709/232 |

FOREIGN PATENT DOCUMENTS

| EP | 1339182 | 8/2003 |
| EP | 1471745 | 10/2004 |
| EP | 2114053 | 11/2009 |
| WO | WO2007104891 | 9/2007 |

* cited by examiner

*Primary Examiner* — Richard Torrente
(74) *Attorney, Agent, or Firm* — Myers Wolin, LLC

(57) ABSTRACT

The invention relates to the field of the synchronization of data delivery onto equipments connected over a packet switching network, in particular when the equipments are devoted to video and audio data or Auxiliary data linked to processing and are connected over a local area network for forming a video/audio production studio.
More precisely the invention concerns a data inserter device for inserting a timestamp in packets, and a delay compensating device for extracting said timestamp and compensating the delivery delay and in particular the jitter, the network delay and the packet generation duration or any additional user delay.

2 Claims, 5 Drawing Sheets

Layers Description

| Synchronization Layers | |
|---|---|
| Application layer | Application layer provides an efficient means to identify additional timing information which is managed and entered by the users |
| Time Code layer | Time Code layer provides an efficient means to post process streams after storage in a timeless world. |
| Alignment layer | Alignemnt layer provides a functional means to time transported streams based on lower layers so as to align them when recombined |
| System layer | System layer provides a functional means to identify the different timing zone (Genlock Plane) and deliver Time Code information in a system. |
| Reference layer | Reference layer provides a functional means to deliver a common reference signal synchronized of Genlock reference signal |
| IEEE1588 layer | IEEE1588 layer provides a functional means to produce a basic accurate system common time reference(s,ns) and deliver a SystemTicker |

Figure 1

PRECISE COMPENSATION OF VIDEO PROPAGATION DURATION

This application claims the benefit, under 35 U.S.C. §119 of European Procedure Patent Application 09306358.4, filed Dec. 31, 2009 and European Procedure Patent Application 10305240.3, filed Mar. 11, 2010.

BACKGROUND OF THE INVENTION

1. Field of the Invention

The invention relates to the field of the synchronization of data delivery onto equipments connected over a packet switching network, in particular when the equipments are devoted to video and audio data processing and are connected over a local area network for forming a video/audio production studio. More precisely the invention concerns a data inserter device for inserting a timestamp in packets, and a delay compensating device for extracting said timestamp and compensate the delivery delay and in particular the jitter, the network delay and the packet generation duration.

2. Description of the Prior Art

Future production environment will move forward using Ethernet technology. This architecture may provide enhancements in the current data stream alignment mechanism which are crucial for video production applications.

This architecture is based on a Local Area Network, which implements only Ethernet switches IEEE1588 compliant Certain problems must be solved to ensure the alignment of Audio/Video/Data streams in an Ethernet/IP production environment.

The production environment shall offer synchronization capabilities based on a reference signal transported and regenerated from a reference counter. The main assumption is to ensure real time transport over an Ethernet/IP network, the data is encapsulated in a UDP/RTP packet.

The solution should be considered as additional to the prior ones which are IEEE1588 layer and Reference Synchronization layer as presented in FIG. 1. These prior works are disclosed in European Patent application 07731734.5.

The IEEE1588 layer, shown on FIG. 1 provides a functional means to produce an accurate system clock (second, nanosecond) over the entire production environment. This IEEE1588 layer implementation ensures the delivery of a System Ticker (CLKech) with a precision of 1 μs.

The System layer provides a functional means to identify different timing zones (also named "Genlock Planes") in the production environment and to regenerate faithfully the genlock OUT signal with the correct phase on the devices which interface Ethernet-less equipment to the packet switched network. This layer provides information in the extension section of the reference message about the deployed system, such as a studio for audio/video data transport or an automotive environment for car manufacturing.

This System layer provides also a means to give the Time Code information to all the devices connected on the packet switched network. This Time Code information is necessary to do timeless processing in order to restore time relationship between streams which have been stored. These System layer is already disclosed in European Patent applications 08300197.4.

Alignment means that the different delays between the reference and all the sources processed by the devices deployed on the system are compensated for. This ensures stream recombination without issues.

Based on System, Reference and IEEE1588 layer implementation, the main requirements to fulfill stream alignment with the proposed solution are:
Compensation for network jitter and network delay;
Delivery of flows on the appropriate Genlock Plane;
Consideration and compensation of the processing delay linked to the way the flow is encapsulated and inserted in the network;
Guarantee of post-production processing on flows issued from different means and places;
Consideration and Compensation of additional delay linked to pre-processing performed by external devices or additional delay provided by the "users"
Handling clean switching of streams in the IP domain.

FIG. 2, shows he different paths taken by the audio and video flows before recombining and delivery.

The interface devices are represented by a Video Ethernet Inserter (VIN), Audio Ethernet Inserter (AIN), Video Ethernet Extractor (VEX), Audio Ethernet Extractor (AEX).

Incoming signals, feeding the Inserter devices, are delivered at the same instant on the Ethernet/IP network. The problem is how to recombine these signals at the extractor devices level in the presence of the following disruptive elements: network jitter and the different delays of different data paths. The jitter disrupts the continuity of the stream at the point of reconstruction. It must be canceled.

There is also a disparity of the path delays, even a maximal delay defined in the standard 802.1 AVB is 2 ms for a complex infrastructure, and the limits of current processing equipment (SDI or AES switcher, SDI or AES router) leads to alignment issues which have an impact on the recombination (Audio/Video lip sync).

The apparatus REF is a module which transmits the synchronization message. Management of the System and Reference layers is ensured by this synchronization message.

One of the goals of the present invention is to propose a solution for realizing an accurate alignment between streams based on the IEEE1588 and the Reference layers.

The invention consists of associating to each data packet (video, audio or data), synchronously with the studio infrastructure reference time base (reference layer), a temporal marking "Time Stamp" on the transmitter side.

On the receiver side, this Time Stamp is extracted. The assumption is that the maximal latency LAN_MaxDly (related to the maximum delay and the maximum jitter) of the deployed network is known and so added to the extracted Time Stamp marker. This information provides the instant, synchronous to the studio infrastructure reference time base (reference layer), when the received packet must be output from the latency buffer. This solution does not care of receiving instant as it is generally done with solutions using Time Stamping. In this way, distinct sources with the same type and format that are aligned at the emission side, are perfectly restituted whatever their data paths.

SUMMARY OF THE INVENTION

Thus, the present invention concerns, according to a first aspect, a device for sending packets over a packet switched network PSN, said device receiving audio and/or video data generated by at least one data source DS1, DS2, said device being configured for packetizing said audio and/or video data into at least one packet and for sending said at least one packet over a packet switched network PSN. According to an embodiment, it comprises means for inserting in said at least one packet a timestamp value TS1, TS2 representative of a date where said at least one packet is ready to be sent over said network PSN.

Said packet comprises a header. According to an embodiment, said means for inserting further inserts a value representative of said packet generation duration in said header.

According to an embodiment, it further comprises means for generating a ramp signal CSR_PCR cadenced by a sampling clock CLKech, wherein the timestamp value TS1, TS2 is equal to a value PCRr resulting from a sampling operation of said ramp signal CSR_PCR.

Thus, the present invention concerns, according to a second aspect a device for receiving packets comprising audio and/or video data transported over a packet switched network PSN, said device comprising a latency buffer, each received packet being temporarily stored in said latency buffer at reception, said packet further comprising a timestamp value TS1, TS2 representative of a date where said packet was ready to be sent over said network PSN, said device comprising means for extracting said timestamp value TS1, TS2 from said received packet and memory means.

According to an embodiment, it further comprises means for evaluating an output timestamp value OTV1, OTV2 corresponding to a date where said packet is output from said latency buffer, wherein said output timestamp value is evaluated from timestamp value TS1, TS2, and from an estimation of the maximum latency MaxDly on said packet switched network PSN stored in said memory means.

Said device further comprises means for extracting from a header of said received packet a value representative of said packet generation duration. According to an embodiment, the means for evaluating evaluates said output timestamp value from said value representative of said packet generation duration.

Said device receiving a first packet comprising a first timestamp TS1 and a second packet comprising a second timestamp TS2, said first and second packet being further comprising data for being combined at said device.

Said means for evaluating evaluates a first output timestamp value OTV1 corresponding to said first packet and a second output timestamp value OTV2 corresponding to said second packet, where the first and second output timestamp values OTV1, OTV2 are equal and correspond to the earliest date between the first timestamp TS1 plus the estimation of the maximum latency MaxDly and the second timestamp TS2 plus the estimation of the maximum latency MaxDly.

Said device receives simultaneously a first packet comprising video data having a first time stamp TS1 and a second packet comprising auxiliary data having a second time stamp TS2.

According to an embodiment, said means for evaluating evaluates a first output timestamp value OTV1 corresponding to said first packet and a second output timestamp value OTV2 corresponding to said second packet, where the first and second output timestamp values OTV1, OTV2 are equal and correspond to the earliest date between the first timestamp TS1 plus the estimation of the maximum latency MaxDly and the second timestamp TS2 plus the estimation of the maximum latency MaxDly.

The present invention concerns, according to a third aspect, a communication system for operating audio and/or video data transported over a packet switched said network.

According to an embodiment, it comprises at least a device for sending device according to the invention and/or at least a device for receiving according to the invention.

BRIEF DESCRIPTION OF THE DRAWINGS

The invention will be better understood and illustrated by means of the following embodiments and execution examples, in no way limitative, with reference to the appended figures on which:

FIG. 1, previously described, shows an organization of synchronization layers;

DESCRIPTION OF PREFERRED EMBODIMENTS

The appended drawings may serve not only to complete the invention, but also to contribute to its definition, if need be.

The temporal marking must use the same time base on the emitter and receiver devices.

This is ensured by the local reference counter (PCR) which is recovered and synchronous on all the devices deployed on the packet switched network. The reference counter value is proposed to be placed in the RTP Time Stamp field of the RTP header. Based on the length of this counter, which is not defined yet, it should be possible to standardize a new RTP header On the transmitter side, a temporal marker TSEi must be created at the appropriate instant to avoid adding additional jitter. This is the instant when the RTP payload is ready to be sent. After this moment, an arbitration mechanism is implemented to prioritize the different flows which are processed by the devices (Best effort, Network System Management, Video, Audio, . . . ). This process introduces arbitration delay and so jitter.

The local transmitter reference counter must be sampled when the RTP payload is filled. It must accompany the RTP payload flow until it is encapsulated in the RTP Header On the receiver side, the local reference counter (PCR) is sampled on the appropriate instant to provide TSRi. This is the instant when the RTP payload is taken into account from the RTP de-encapsulation processing. At this moment, a process is launched to check if the received packet is within the allowed delay or off the allowed delay.

The receiver reference counter (PCR), is compared with the received Time Stamp: TSEi+LAN_MaxDly=TSOi with TSOi>TSRi. When the following equation is satisfied, the received RTP payload is read from the payload buffer and available for further processing.

The TIME STAMP value complies with the definition proposed in the RFC 3550. Based on the foreseen length for this field (64 bits), a new RTP header profile will be proposed and applied to suit the application requirements.

Figure 2:
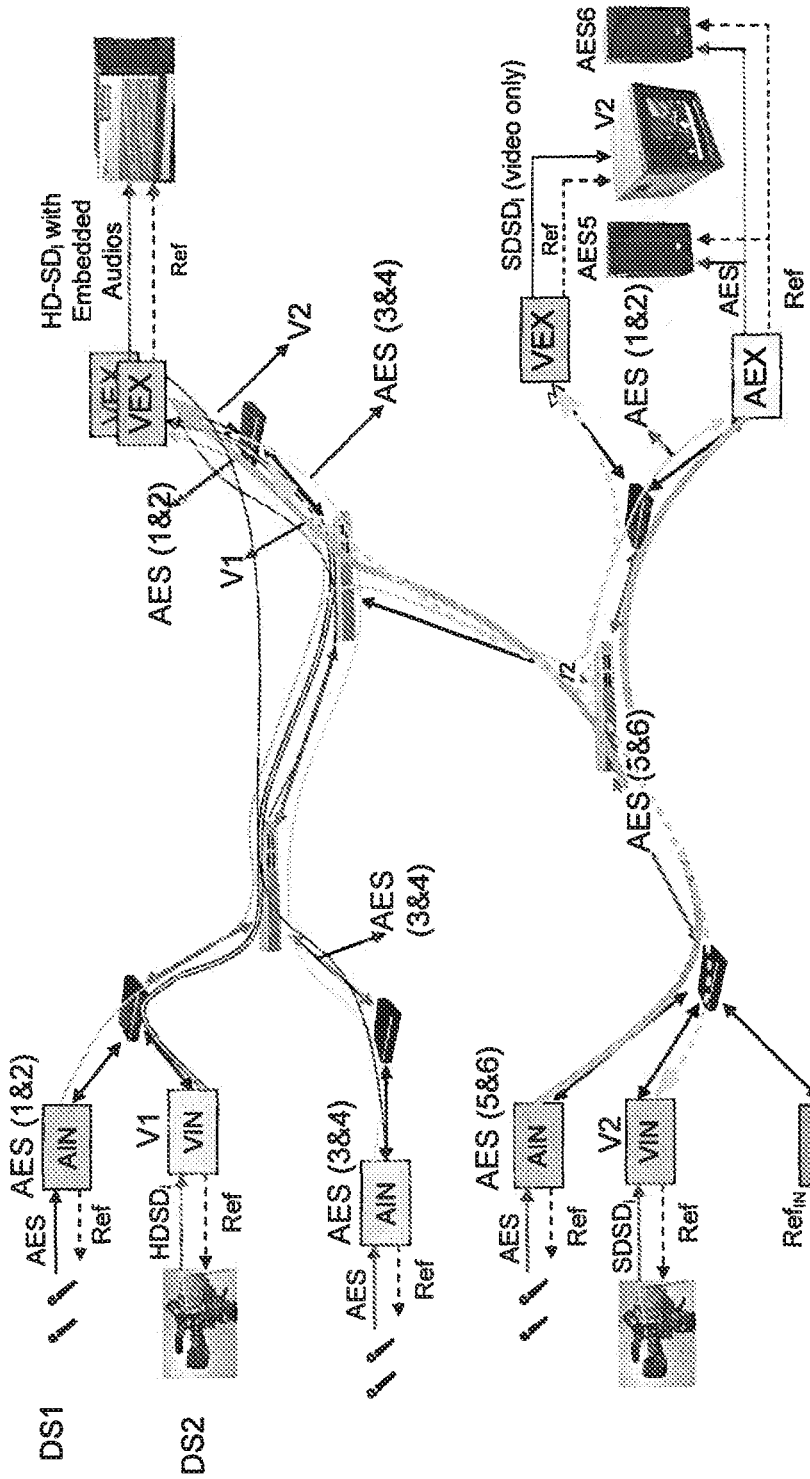
FIG. 2, previously described, shows as an illustrative example, the different paths taken by the audio and video flows before recombining and delivery.
Figure 3:
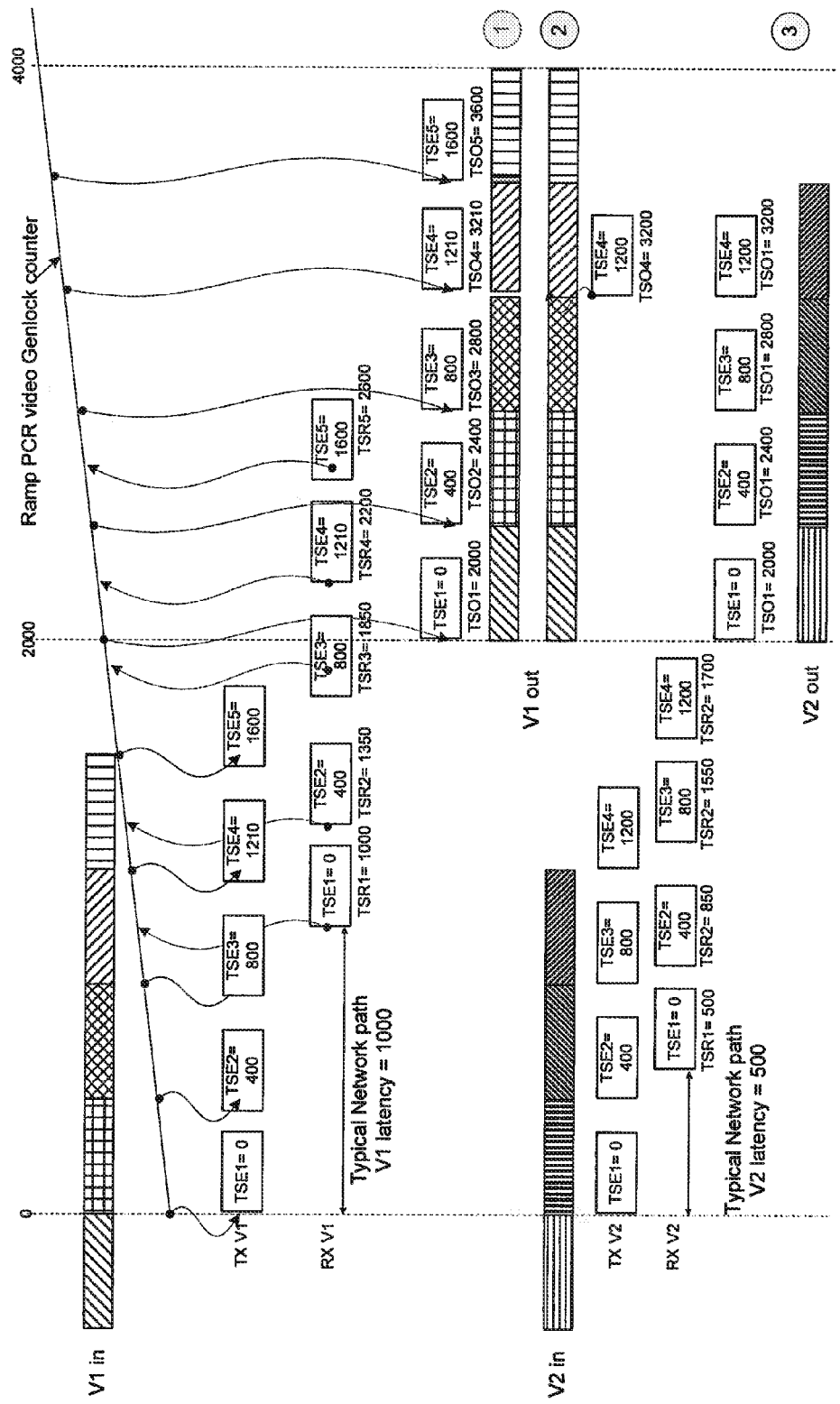
FIG. 3, represents a flow delivery with a compensation of the jitter and network delay according to the invention.

The FIG. 3 takes the example of two different payload sources inserted at different location in a IP network but extracted in the same location of this IP network. V1 and V2 are passing through a different Network path. It shows, on V1 out drawings, two different ways to handle the delay and jitter for V1 source:

Bubble 1 represents the delivery of the V1 in flow which has been time stamped at the moment the packet is send by the transmitter (priority packet handling affects the sending instant and jitters the packets): Loss and overlap of data occurs.

Bubble 2 represents the delivery of the same V1 in flow which has been processed with priority packet handling is a part of the network jitter: then, data is perfectly reconstructed if the Latency value is correctly parameterized.

Bubble 3 represents the delivery of the V2 in flow which has been processed as recommended. On this data path, the network latency is lower than the V1 in latency: Both bubble 2 & 3 flows are perfectly reconstructed and aligned, thanks to the latency value.

Network Jitter and Network Delay are handled thanks to the reference layer which allows recovering a synchronous reference counter on devices spread all over the network.

Independently of the mechanism of jitter and delay compensation, there is also a need for taking into account the packet generation duration. This compensation mechanism can be combined with the mechanism described above.

Figure 4:
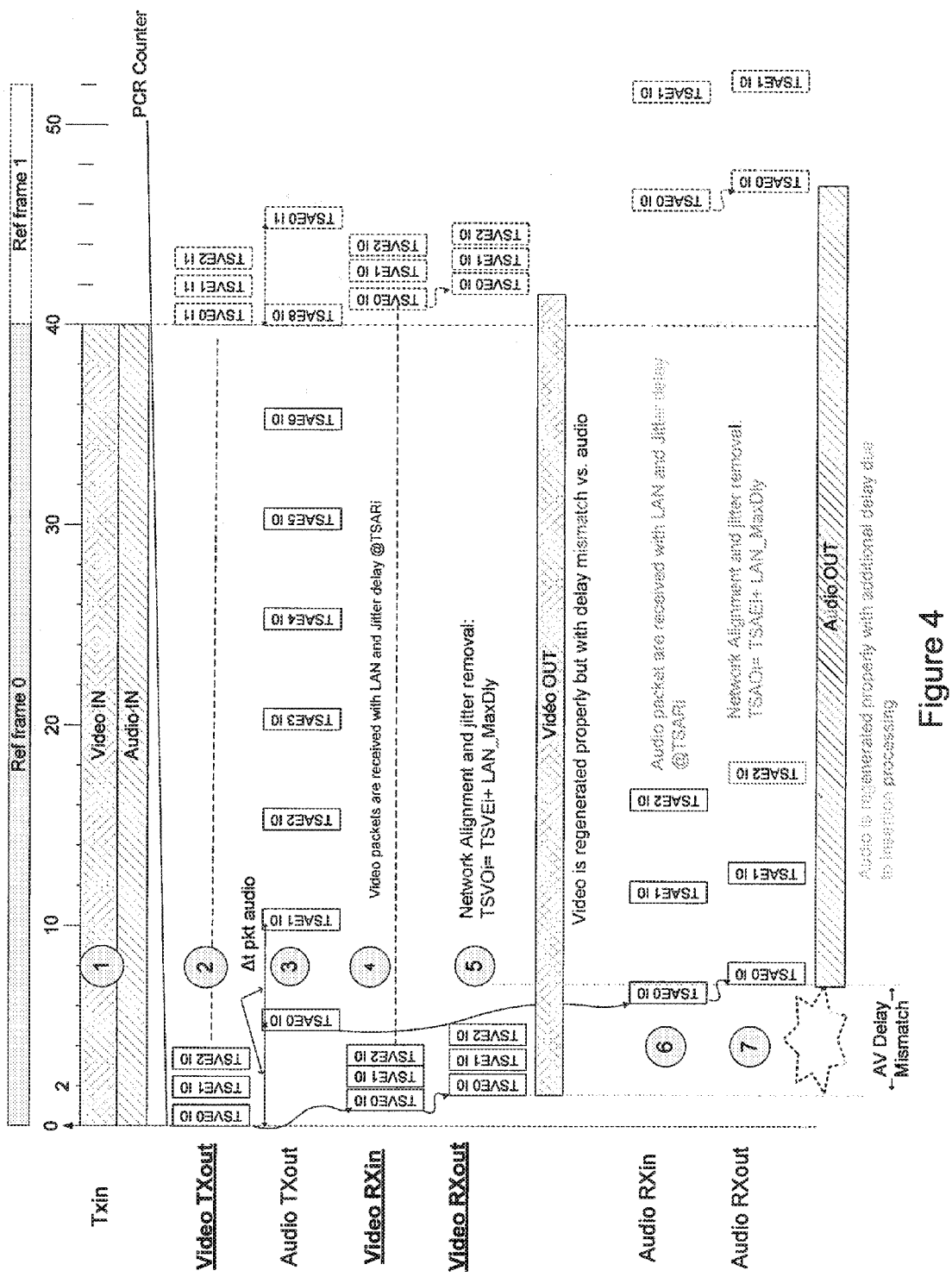
FIG. 4, represents a flow delivery without compensation of the packet generation duration.

As shown on the FIG. 4, if there is no packet generation duration compensation, one observes a delay mismatch when combining an audio stream AUDIOIn and an video stream VIDEOIn which were perfectly temporally aligned.

On Bubble 1: Incoming continuous streams are synchronous and Audio/Video Delay matches.

Bubbles 2, 3: shows the stream packetization process, synchronous to Reference PCR Time Base according to Payload Profile requirements (packet size, number of packet during a reference period . . . ). Packet processing time depends of the Payload profile and mainly of its rate which is quite different for video and audio data.

Bubbles 4, 6: Stream packets are received after Network transport with LAN jitter and delay.

Bubbles 5, 7: thanks to embedded Time Stamp and to the mechanism described above, Audio and Video streams are re-generated free of jitter and align accord to static LAN MaxDly. But due to stream LAN insertion process an AV delay mismatch has been generated which is not compensated here.

Figure 5:
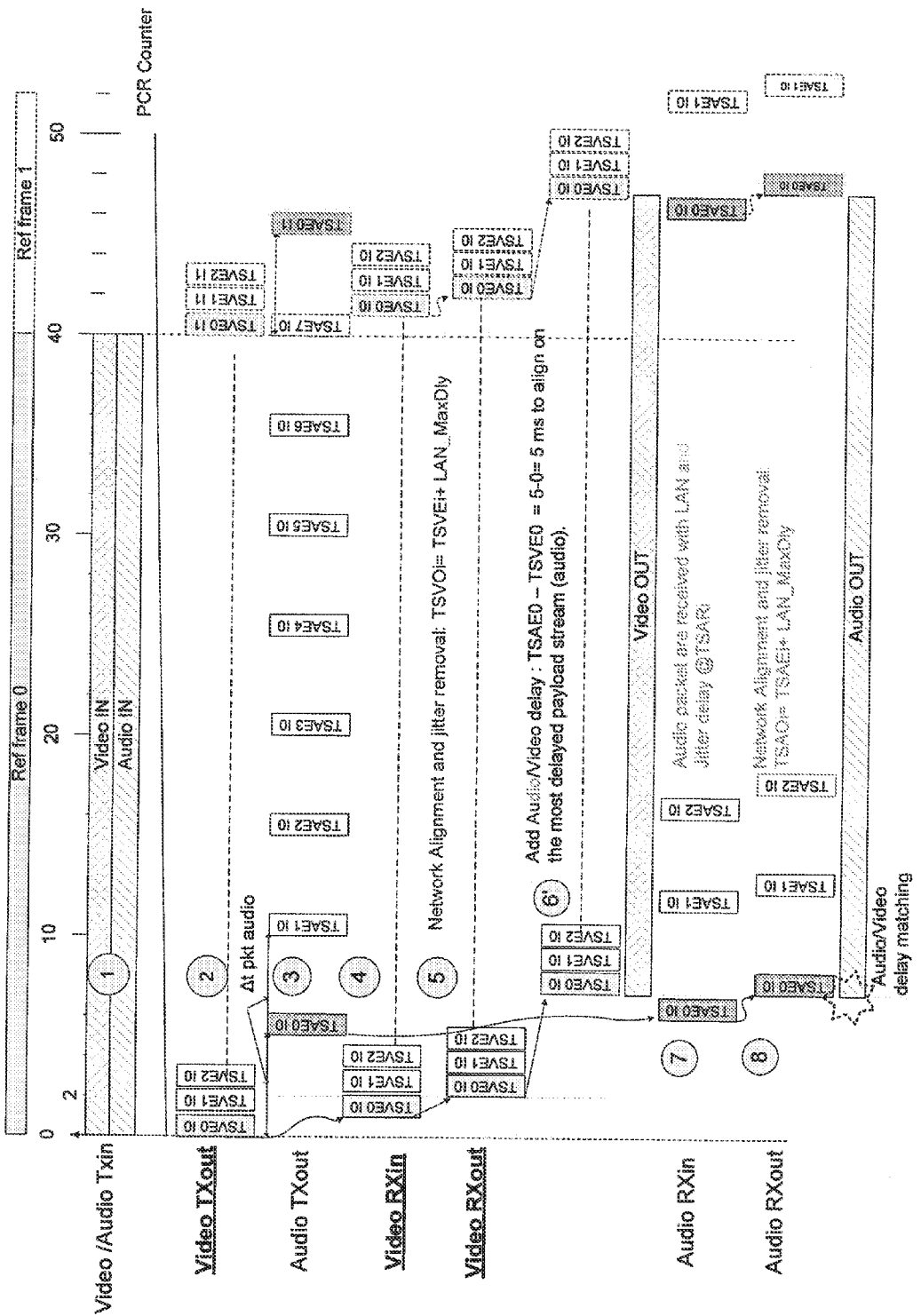
FIG. 5, represents a flow delivery with a compensation of the packet generation duration according to the invention.

FIG. 5, represents a flow delivery with a compensation of the packet generation duration according to the invention. On this figure:

Bubble 1: Incoming continuous streams are synchronous and Audio/Video Delay matches.

Bubbles 2, 3: Stream packetization process, synchronous to Reference PCR Time Base according to Payload Profile requirements (packet size, number of packet during a reference period . . . ). Packet processing time depends of the Payload profile and mainly of its rate.

Bubbles 4, 7: Stream packets are received after Network transport with LAN jitter and delay.

Bubbles 5, 6, 8: thanks to embedded Time Stamp and Payload header bytes, Audio and Video streams are re-generated free of jitter and align according to static LAN MaxDly. But this time AV delay (TSEA0-TSEV0) is calculated and so Video stream is delayed to match with audio output.

In the same way, thanks to an addition field of the payload header user processing delay can be carried and then computed at receiving end.

Packet generation duration compensation is handled thanks to the alignment layer which defines specific fields in the IP data packet which allow doing computation at its reception.

The invention is not limited to the embodiments of Synchronisation of stream for video production purpose described above, only as examples, but it encompasses all alternative embodiments which may be considered by one skilled in the art within the scope of the claims hereafter.

The invention claimed is:

1. Device for receiving packets comprising audio and/or video data transported over a packet switched network, said device comprising a latency buffer, each received packet being temporarily stored in said latency buffer at reception, said received packet further comprising an input timestamp value representative of a date where said received packet was ready to be sent over said packet switched network, said device comprising means for extracting said input timestamp value from said received packet and memory means, wherein
said device further comprises means for evaluating an output timestamp value corresponding to a date where said received packet is output from said latency buffer, wherein said output timestamp value is evaluated from said input timestamp value, and from an estimation of the maximum latency on said packet switched network stored in said memory means; and
said device is configured to receive a first packet comprising a first input timestamp value and a second packet comprising a second input timestamp value, said first and second packet further comprising data for being combined at said device, wherein said means for evaluating evaluates a first output timestamp value corresponding to said first packet and a second output timestamp value corresponding to said second packet, where the first and second output timestamp values are equal and correspond to the earliest date between the first input timestamp plus the estimation of the maximum latency and the second input timestamp plus the estimation of the maximum latency.

2. Device according to claim 1, said device further comprising means for extracting from a header of said received packet a value representative of a generation duration of said received packet, wherein the means for evaluating evaluates said output timestamp value from said value representative of said generation duration.

* * * * *